B. C. KNUDSEN.
SLED.
APPLICATION FILED MAY 4, 1916.

1,298,355.

Patented Mar. 25, 1919.

WITNESSES
Chas. E. Kemper
Wm Freeman

INVENTOR
Barney C. Knudsen.
BY
Richard Bowen,
ATTORNEY

UNITED STATES PATENT OFFICE.

BARNEY C. KNUDSEN, OF MONTCLAIR, NEW JERSEY.

SLED.

1,298,355. Specification of Letters Patent. Patented Mar. 25, 1919.

Application filed May 4, 1916. Serial No. 95,470.

*To all whom it may concern:*

Be it known that I, BARNEY C. KNUDSEN, a citizen of Norway, residing at Montclair, in the county of Essex and State of New Jersey, have invented certain new and useful Improvements in Sleds, of which the following is a specification.

This invention has relation to sleighs of the flexible runner type, and the nature and objects thereof will be readily apparent to those skilled in the art to which it appertains, in the light of the following explanation of the accompanying drawings, illustrating what I now believe to be the preferred embodiments or mechanical expressions of my invention from among other forms and arrangements within the spirit thereof, or the scope of the appended claim.

However, an object of the invention is to provide means for conveniently and easily flexing the runners of the sleigh whereby it may be steered or directed in its course.

In addition to the foregoing my invention comprehends improvements in the details of construction and arrangement of parts, to be hereinafter described and particularly pointed out in the appended claim.

In the accompanying drawings, in which similar and corresponding parts are designated by the same characters of reference throughout the several views in which they appear:—

Figure 1:
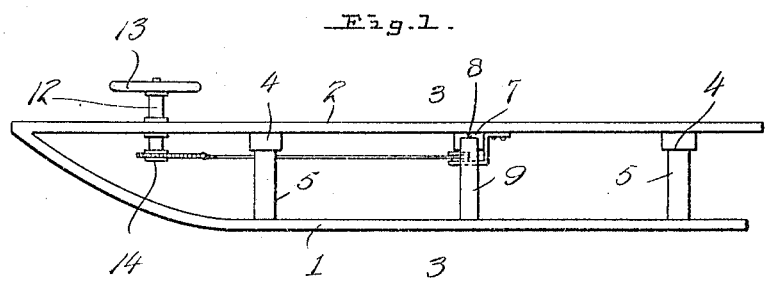
Figure 1 is a view in side elevation of a sleigh of the flexible runner type embodying my improvements.

With reference to the drawings, 1 indicates the flexible runners of a sleigh, and 2 the horizontal side rails. A platform 3 is mounted upon transverse connecting bars 4, disposed between the side rails 2, and secured therebeneath. The platform is further supported upon substantially U-shaped supports 5, inverted and secured at their terminals to the runners, and rigidly secured at their intermediate portions to the transverse bars 4 by means of rivets or the like 6.

A transverse bar 7 is secured beneath the platform, to said platform and the side rails 2, and is similar in all respects to one of the bars 4 except for the provision of a longitudinal recess 8 in which is slidably mounted the intermediate portion of an inverted U-shaped support 9, secured at its terminals to the runners 1 of the sleigh. Brackets 10 are secured to the under side of the platform 3, for supporting a pair of spaced pulleys 11 arranged one at each side of the longitudinal center of the sleigh.

Figure 2:
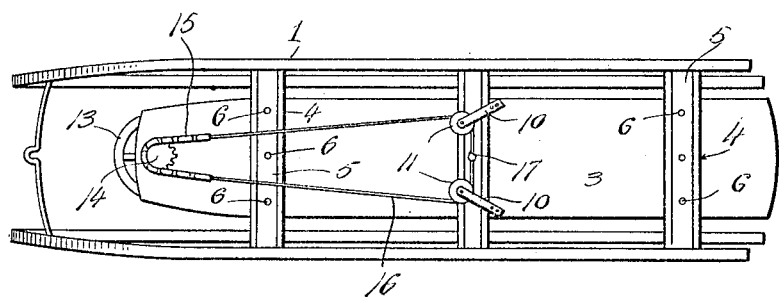
Fig. 2 is a view thereof in bottom plan.
Figure 3:
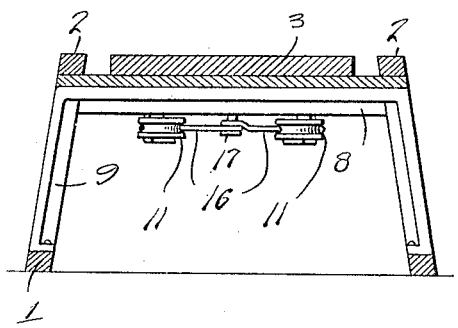
Fig. 3 is a transverse section on the line 3—3 of Fig. 1.

A vertical shaft 12 is journaled in the platform at the forward portion thereof and is provided at its upper end with a steering wheel 13, and at its lower end with a sprocket 14. A short section of chain 15 is engaged around the sprocket 14, and is connected at its ends to a cord 16 or other flexible element which passes around the pulleys 11, and is secured to a pin 17 depending from the bracket or support 9, as illustrated in Figs. 2 and 3. It will be remembered that while all the supports 5 and 9, are secured at their lower ends to the runners, only the supports 5 are rigidly secured to the cross bars 4, the support 9 being slidably mounted as before stated in the recess 8, of the bar 7. Owing to this arrangement, if the wheel 13 is rotated in either direction during the course of travel of the sleigh, tension is placed upon one side or the other of the flexible member 16, whereby the support 9 is shifted transversely of the sleigh, thereby slightly flexing the runners. The steering of the sleigh is thus effected.

Having thus fully described my invention what I claim as new and desire to secure by Letters Patent, is:—

A sleigh having flexible runners, a steering shaft and wheel, a sprocket mounted on the shaft, pulleys stationarily mounted one at each side of the longitudinal center of the sleigh, a support movable with the runners and a flexible element passing around the sprocket and the pulleys and connected to the support.

In testimony whereof I affix my signature in presence of two witnesses.

BARNEY C. KNUDSEN.

Witnesses:
JOHN J. KNUDSEN,
WALFRID JOHNSON.

Copies of this patent may be obtained for five cents each, by addressing the "Commissioner of Patents, Washington, D. C."